(12) United States Patent
Snoek

(10) Patent No.: US 10,002,136 B2
(45) Date of Patent: Jun. 19, 2018

(54) MEDIA LABEL PROPAGATION IN AN AD HOC NETWORK

(71) Applicant: QUALCOMM Incorporated, San Diego, CA (US)

(72) Inventor: Cornelis Gerardus Maria Snoek, Volendam (NL)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 14/810,422

(22) Filed: Jul. 27, 2015

(65) Prior Publication Data

US 2017/0031934 A1 Feb. 2, 2017

(51) Int. Cl.
- G06F 17/30 (2006.01)
- H04L 12/751 (2013.01)
- H04W 84/18 (2009.01)

(52) U.S. Cl.
CPC .... *G06F 17/30091* (2013.01); *G06F 17/3002* (2013.01); *G06F 17/30106* (2013.01); *H04L 45/08* (2013.01); *H04W 84/18* (2013.01)

(58) Field of Classification Search
None
See application file for complete search history.

(56) References Cited

U.S. PATENT DOCUMENTS

| 8,396,864 | B1 * | 3/2013 | Harinarayan | G06F 17/30707 707/722 |
| 8,452,790 | B1 | 5/2013 | Mianji | |
| 8,909,771 | B2 | 12/2014 | Heath | |
| 8,977,698 | B2 | 3/2015 | Veda et al. | |
| 8,995,815 | B2 | 3/2015 | Maharajh et al. | |
| 2002/0169770 | A1 * | 11/2002 | Kim | G06F 17/3071 |
| 2005/0113066 | A1 * | 5/2005 | Hamberg | H04L 29/06027 455/411 |
| 2008/0189268 | A1 * | 8/2008 | Au | G06F 17/30684 |
| 2008/0228749 | A1 * | 9/2008 | Brown | G06F 17/30796 |
| 2009/0006285 | A1 * | 1/2009 | Meek | G06Q 10/10 706/12 |
| 2010/0232656 | A1 | 9/2010 | Ryu | |
| 2012/0084302 | A1 * | 4/2012 | Murdock | G06F 17/30241 707/754 |

(Continued)

OTHER PUBLICATIONS

Alex Krizhevsky, et al., "ImageNet Classification with Deep Convolutional Neural Networks", Advances in Neural Information Processing Systems,25, XP055113686,9 pp., (2012).

(Continued)

*Primary Examiner* — Hung Le
(74) *Attorney, Agent, or Firm* — Seyfarth Shaw LLP

(57) ABSTRACT

A method of labeling media files includes connecting to at least one device on an ad hoc network and indexing media and corresponding labels in the ad hoc network. The method also includes comparing a computed feature representation of a seed media file with feature representations of other media files in the ad hoc network to create an ordered list. The method further includes determining whether a label corresponding to a media file on the ordered list matches the label of the seed media file and increasing a label frequency when the label corresponding to the media file on the ordered list matches the label of the seed media file.

28 Claims, 9 Drawing Sheets

(56) References Cited

U.S. PATENT DOCUMENTS

| | | | | |
|---|---|---|---|---|
| 2013/0071089 A1* | 3/2013 | Fujimoto | ............... | G11B 27/10 386/241 |
| 2013/0325462 A1* | 12/2013 | Somekh | ............ | G06F 17/30265 704/235 |
| 2014/0040275 A1* | 2/2014 | Dang | ................. | G06F 17/2785 707/741 |
| 2014/0156743 A1* | 6/2014 | Veda | ...................... | G06Q 10/10 709/204 |
| 2014/0222755 A1* | 8/2014 | Soderberg | ......... | G06F 17/30265 707/609 |
| 2015/0100590 A1* | 4/2015 | Robinson | .......... | G06F 17/30707 707/749 |
| 2015/0149469 A1* | 5/2015 | Xu | .................... | G06F 17/30038 707/740 |
| 2016/0127826 A1* | 5/2016 | Chavez | ................. | H04H 60/04 381/119 |
| 2016/0237448 A1* | 8/2016 | Cahoon | ............. | C12N 15/8247 |
| 2016/0379274 A1* | 12/2016 | Irwin | ..................... | G06F 3/165 705/14.67 |

OTHER PUBLICATIONS

International Search Report and Written Opinion—PCT/US2016/033920—ISA/EPO—dated Aug. 3, 2016.

Li H., et al., "Highly Efficient Forward and Backward Propagation of Convolutional Neural Networks for Pixelwise classification", Multimedia Laboratory, The Chinese University of Hong Kong, XP055290578, Dec. 15, 2014 (Dec. 15, 2014), 10 pages. Retrieved from the Internet: URL: https://arxiv.org/pdf/1412.4526v2.pdf [retrieved on Jul. 22, 2016).

Rubin T.N., et al.,. "Statistical Topic Models for Multi-Label Document Classification", Machine Learning, Kluwer Academic Publishers-Plenum Publishers, NE, XP035071641 ,Dec. 29, 2011 (Dec. 29, 2011), vol. 88, No. 1-2, pp. 157-208, ISSN: 1573-0565, DOI: 10.1007/S10994-011-5272-5.

* cited by examiner

700

Establish ad hoc wireless network A
Index images and labels in A
for each image I in A do
    Find k nearest visual neighbors of I from all the labeled images in A
    for label w in label of I do
        networkLabelRelevance (w, I, k, A) = 0
    end for
    for image J in the neighbor set of I do
        for label w in (labels of J ∩ labels of I) do
            networkLabelRelevance (w, I, k, A) = networkLabelRelevance (w, I, k, A) + 1
        end for
    end for
    networkLabelRelevance (w, I, k, A) = max(networkLabelRelevance (w, I, k, A), 1)
end for

*FIG. 7*

MEDIA LABEL PROPAGATION IN AN AD HOC NETWORK

BACKGROUND

Field

Certain aspects of the present disclosure generally relate to machine learning and, more particularly, to improving systems and methods of labeling media files.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks insert. That is, in deep learning architectures, the output of a first layer of neurons becomes an input to a second layer of neurons, the output of the second layer of neurons becomes an input to a third layer of neurons, and so on. These deep neural networks may be trained to recognize a hierarchy of features and thus, have been used in object recognition and other applications. Like convolutional neural networks, computation in these deep learning architectures may be distributed over a population of processing nodes, which may be configured in one or more computational chains. These multi-layered architectures may be trained one layer at a time and may be fine-tuned using back propagation, for example.

Other models are also available for object recognition. For example, support vector machines (SVMs) are learning algorithms that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

Certain aspects of the present disclosure provide a method of labeling media files. The method includes connecting to at least one device on an ad hoc network and indexing media and corresponding labels in the ad hoc network. The method also includes comparing a computed feature representation of a seed media file with feature representations of other media files in the ad hoc network to create an ordered list. The method further includes determining whether a label corresponding to a media file on the ordered list matches the label of the seed media file and increasing a label frequency when the label corresponding to the media file on the ordered list matches the label of the seed media file.

Certain aspects of the present disclosure provide an apparatus configured to label media files. The apparatus includes a memory and at least one processor coupled to the memory. The one or more processors are configured to connect to at least one device on an ad hoc network and to index media and corresponding labels in the ad hoc network. The processor(s) is(are) also configured to compare a computed feature representation of a seed media file with feature representations of other media files in the ad hoc network to create an ordered list. The processor(s) is(are) further configured to determine whether a label corresponding to a media file on the ordered list matches the label of the seed media file and to increase a label frequency when the label corresponding to the media file on the ordered list matches the label of the seed media file.

Certain aspects of the present disclosure provide an apparatus configured to label media files. The apparatus includes means for connecting to at least one device on an ad hoc network and means for indexing media and corresponding labels in the ad hoc network. The apparatus also includes means for comparing a computed feature representation of a seed media file with feature representations of other media files in the ad hoc network to create an ordered list. The apparatus further includes means for determining whether a label corresponding to a media file on the ordered list matches the label of the seed media file and means for increasing a label frequency when the label corresponding to the media file on the ordered list matches the label of the seed media file.

Certain aspects of the present disclosure provide a computer program product for labeling media files. The computer program product includes a non-transitory computer-readable medium having program code recorded thereon. The program code includes program code to connect to at least one device on an ad hoc network and to index media and corresponding labels in the ad hoc network. The program code also includes program code to compare a computed feature representation of a seed media file with feature representations of other media files in the ad hoc network to create an ordered list. The program code further includes program code to determine whether a label corresponding to a media file on the ordered list matches the label of the seed media file and to increase a label frequency when the label corresponding to the media file on the ordered list matches the label of the seed media file.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 illustrates pseudo code in accordance with aspects of the present disclosure.

DETAILED DESCRIPTION

Figure 1:
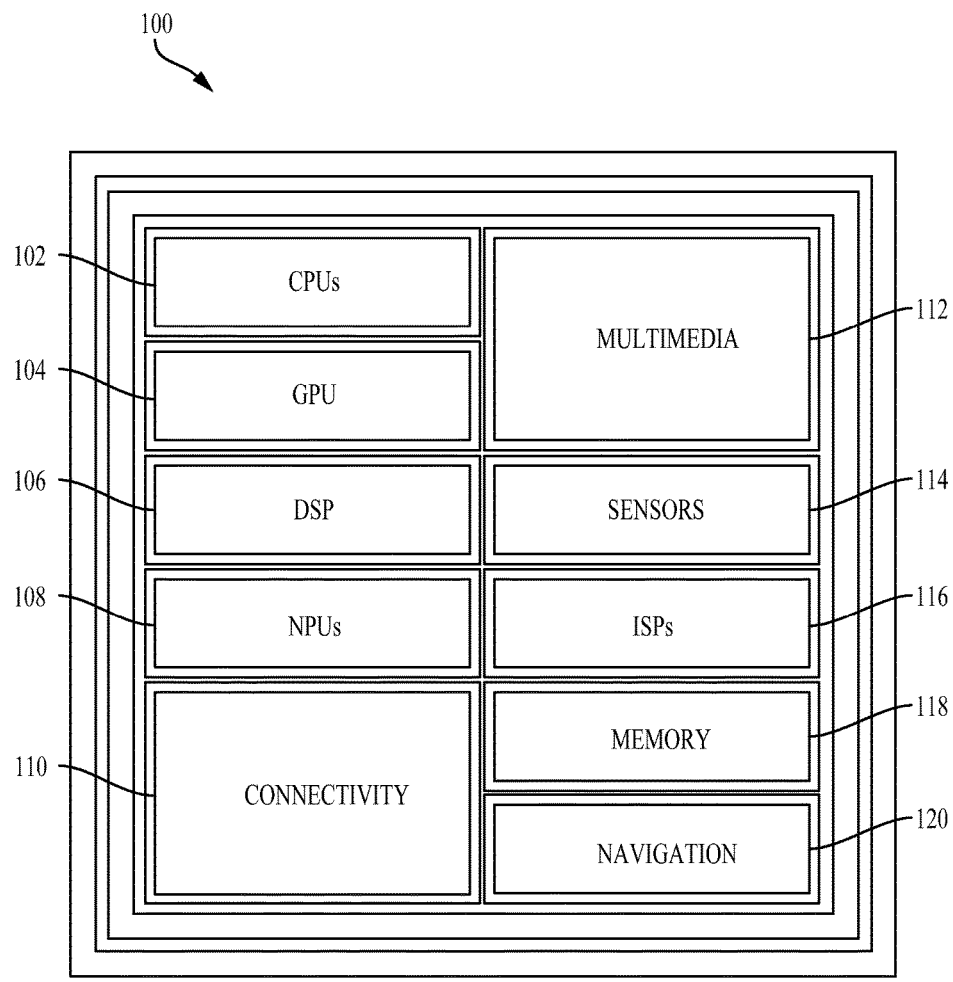
FIG. 1 illustrates an example implementation of designing a neural network using a System-on-a-Chip, including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Media Label Propagation in an Ad Hoc Network

Media files may be labeled based on the content recognized within them or the context of their recording. Recognition of content within an image, for example, may yield a group of labels such as "man," "mountain," "lake," and "fish." Labels based on a context of a recording may yield labels such as "Nikon," "Tuesday," or "Colorado." For the purposes of image search and retrieval, as well as other purposes, content-based labels may be more relevant. For audio files, label information may relate to lyrical content, genre, recording artist, studio location, and the like. Media files may relate to a multitude of sensory modalities and sensor types. A media file recorded on a "digital nose" may contain olfactory data and may be labeled with olfactory descriptors such as "citrus" or "lavender."

Labels for a media file may be provided by humans who rely on knowledge about the media file and further rely on their own senses to understand the contents of the media file. Humans may also rely on sensors and data processing methods to understand a media file and then ascribe a label. For example, infrared imagery, x-ray tomography, functional magnetic resonance imaging, and other forms of digital media are captured and processed by machines before they may be interpreted and labeled by a human. Increasingly, however, labels may be provided by machines. As described below, convolutional networks, deep belief networks, recurrent neural networks, other forms of neural network, combinations therein, and possibly in combination with other object categorization methods, may be employed to ascribe labels to media files without human intervention.

Accurate labeling of media files may facilitate training of machine learning methods directed to labeling media files, thus creating a positive feedback loop of increasing accuracy. For example, accurately labeled media files may be added to a training or testing set of a deep learning classifier and may improve or validate performance of the classifier. Inaccurately labeled media files, in contrast, may be detrimental to machine learning methods, unless the inaccurately labeled media files can be deleted, ignored, or reassigned to a more suitable training or testing set category. Accurate labeling of media files may also facilitate searching through a database of media files.

Despite advances in deep learning and machine learning in general, machine provided labels for the content of media files, such as in photos, audio recordings, or videos, tend to be unreliable and incomplete. Human provided labels for media files may also be unreliable and incomplete. There is a fundamental problem, therefore, relating to how to interpret the relevance of a human or machine provided label for a media file with respect to the content the label is describing.

The present disclosure is directed to labeling media files according to their content by using comparisons with other media files that are labeled. The labels of the other media files may be unreliable and incomplete. Despite reliability and completeness concerns, an effective and efficient way to improve the quality and expressiveness of media labels may be achieved that rests on the intuition that if different media items are similar in content and their label, the label is more likely to be correct. This intuition may be exploited by computing a content-based similarity of the media to a large and preprocessed set of other labeled media and counting the number of label co-occurrences in the most similar media.

Existing works directed to using content-based similarity for labeling operate on a static, centralized media collection. Methodologies for quickly leveraging labeled media of various, perhaps mobile, devices in an ad hoc network to improve and extending the labels of media on all or selected connected devices are unavailable. Aspects of the present disclosure are directed to such a method. In particular, in aspects of the present disclosure, machines may coordinate amongst themselves to improve media labels.

Consider a set of devices that may connect to an ad hoc network. The devices may be smartphones, drones, cars, homes and the like. Further, consider the media content stored on the devices and their labels. An aspect of the present disclosure includes a method of connecting to a device on an ad hoc network, indexing media and corresponding labels on the connected devices, and comparing a feature representation of a seed media file with feature representations of other media files on the ad hoc network. The method may compute feature representations from the media or may rely on pre-computed features, if available. The seed media file may then be compared to other media files, for instance the top K most similar images that also share a label with the seed media. K may be chosen to reflect an empirically useful number for the media type, such as from about 5 to about 10000 for images. Alternatively, K may be chosen as a fraction of the number of available media files on the network, perhaps further constrained based on communication bandwidth and/or device storage considerations. The label frequency of the item may then be updated with the shared label or labels. In this way, the relevance of the media label may be updated by exchanging information between devices.

FIG. 1 illustrates an example implementation of the aforementioned method of labeling media files using a system on chip (SOC) 100. The SOC 100 may include a general-purpose processor or multi-core general-purpose processors (CPU) 102, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks configured to perform specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an ARM instruction set or the like. In an aspect of the present disclosure, the instructions loaded into the general-purpose processor 102 or connectivity block 110 may include code for connecting to at least one device on an ad hoc network and indexing media and corresponding labels in the ad hoc network. The instructions loaded into the general-purpose processor 102 may also include code for comparing a computed feature representation of a seed media with feature representations of other media in the ad hoc network to create an ordered list (e.g., in conjunction with the image signal processing block 116 and/or the NPU block 108). The instructions loaded into the general-purpose processor 102 may further include code for determining whether a label corresponding to the media file on the list matches a label of the seed media file and code for increasing a label frequency when the label corresponding to the media file on the list matches the label of the seed media file.

Figure 2:
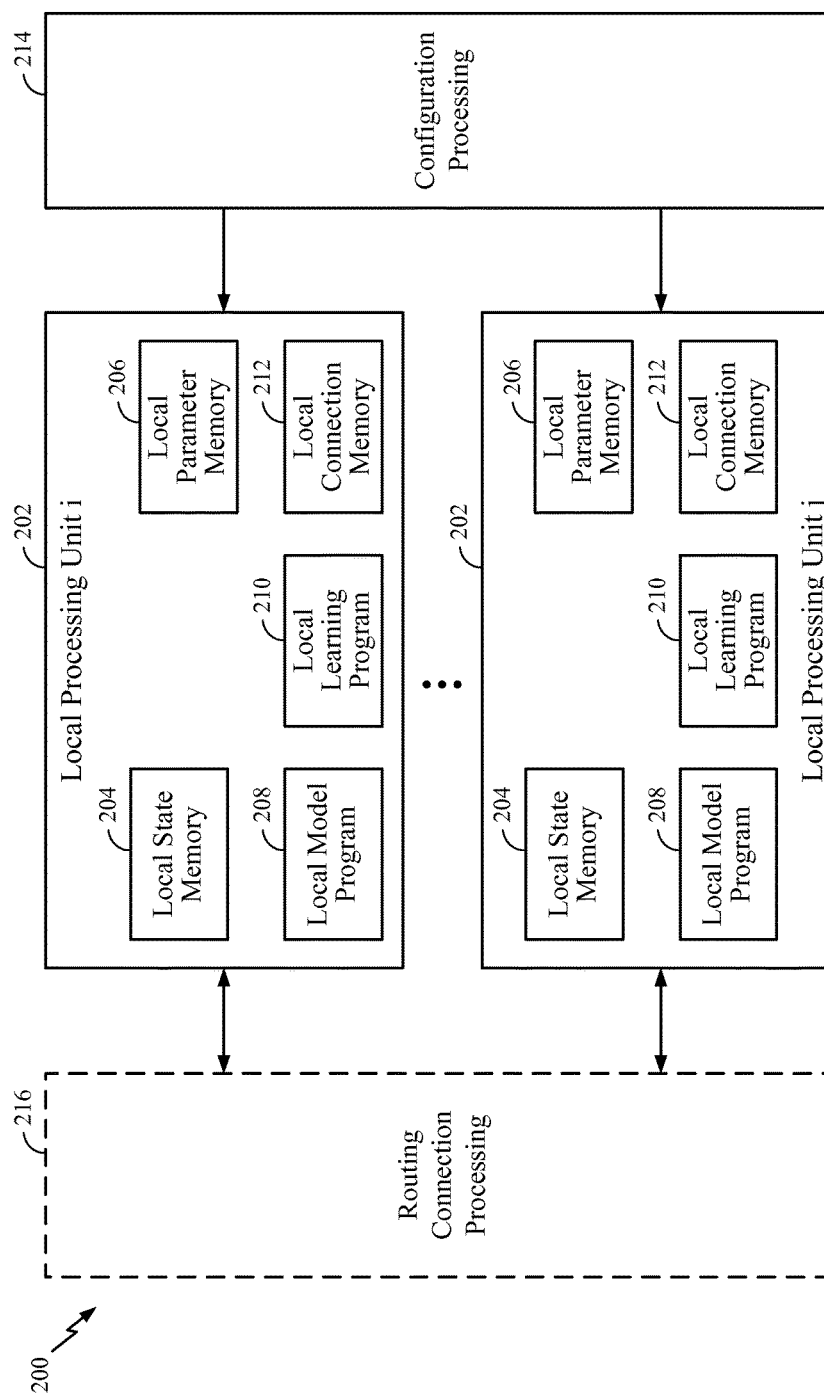
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processing unit 214 for providing configurations for local memories of the local processing unit, and with a routing connection processing unit 216 that provides routing between the local processing units 202.

As discussed above, deep learning architectures may perform an object recognition task by learning to represent inputs at successively higher levels of abstraction in each layer, thereby building up a useful feature representation of the input data. In this way, deep learning may address a major bottleneck of traditional machine learning. Prior to the advent of deep learning, a machine learning approach to an object recognition problem may have relied heavily on human engineered features in combination with a shallow classifier. A shallow classifier may be a two-class linear classifier, for example, in which a weighted sum of the feature vector components may be compared with a threshold to predict a classification for the input. Human engineered features may be templates or kernels tailored to a specific problem domain by engineers with domain expertise. Deep learning architectures, in contrast, may learn to represent features through training. Furthermore, a deep network may learn to represent and recognize new types of features that a human may not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
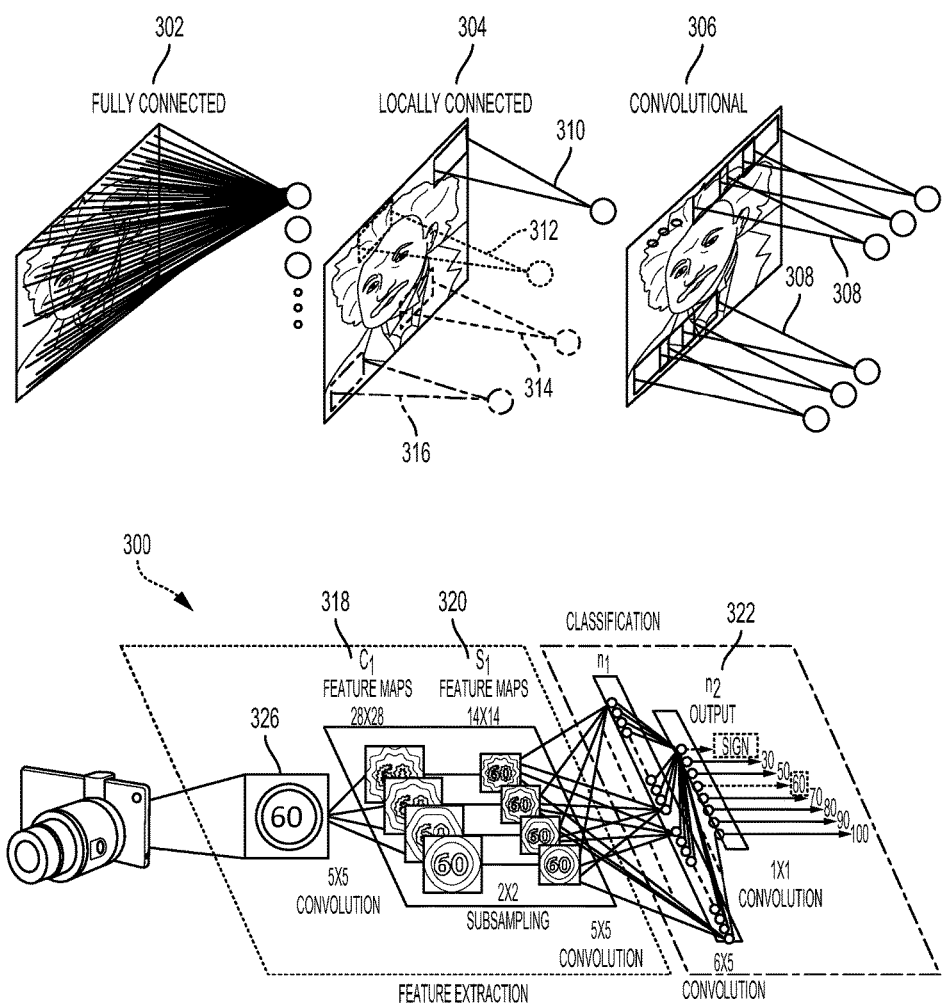
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g. 308). More generally, a locally connected layer of a network may be configured so that each neuron in a layer will have the same or a similar connectivity pattern, but with connections strengths that may have different values (e.g. 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g. 320) receiving input from a range of neurons in the previous layer (e.g. 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
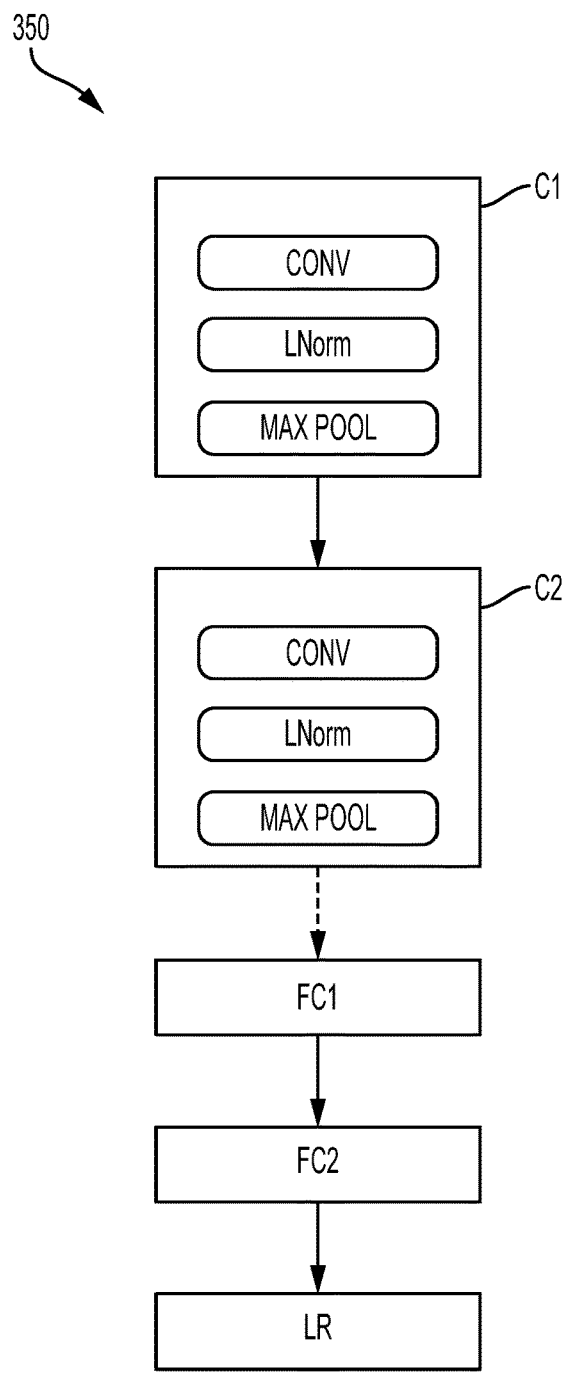
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
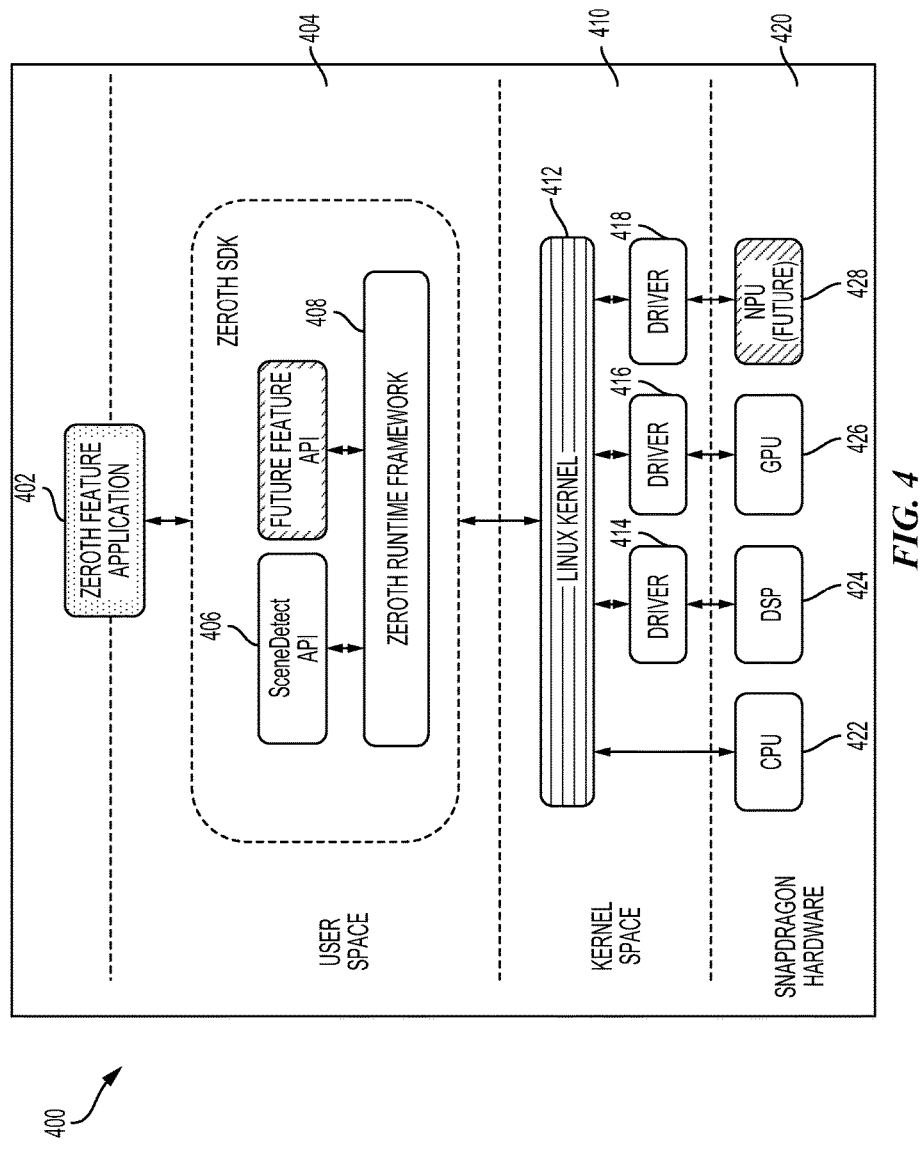
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
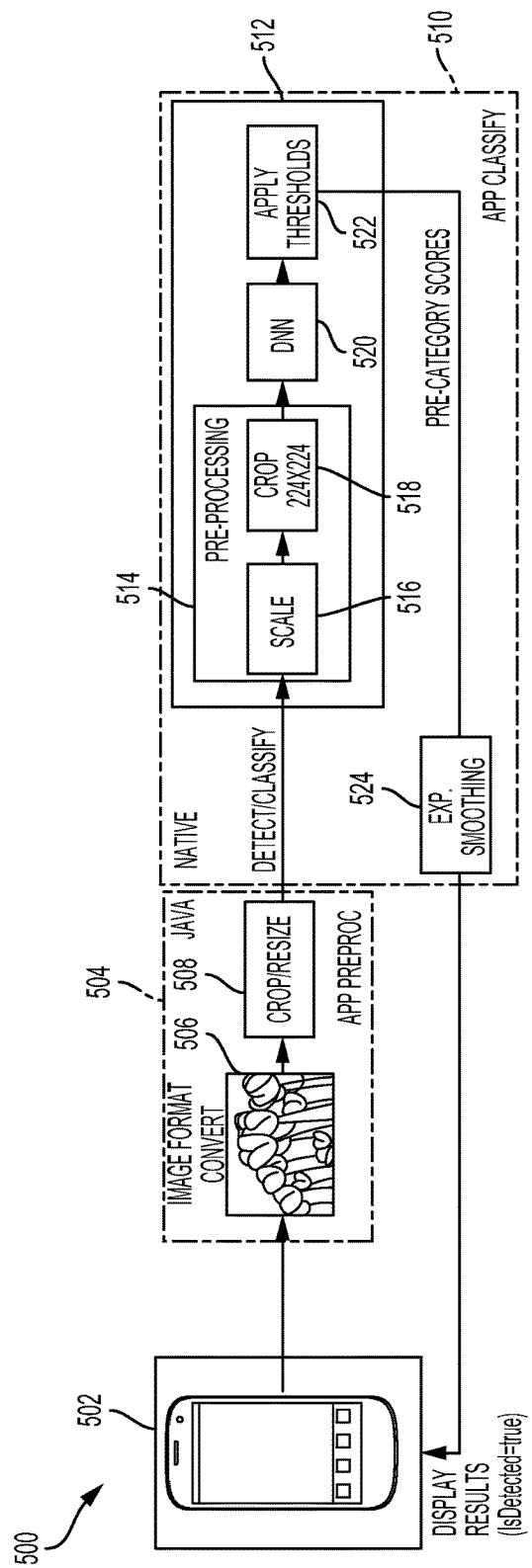
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a preprocess module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a model is configured for connecting to at least one device on an ad hoc network and indexing media and corresponding labels in the ad hoc network. The model is also configured for comparing a computed feature representation of a seed media file with feature representations of other media in the ad hoc network to create an ordered list; determining whether a label corresponding to the media file on the list matches a label of the seed media file; and increasing a label frequency when the label corresponding to the media file on the list matches the label of the seed media item. The model includes a connecting means, indexing means, computing means, comparing means, determining means and increasing means. In one aspect, connecting means, indexing means, computing means, comparing means, determining means and increasing means. In one aspect, the computing means, comparing means, and/or determining means may be the general-purpose processor 102, the DSP 106, memory block 118, local processing unit 202, and or the routing connection processing unit 216 configured to perform the functions recited. In another configuration, the aforementioned means may be any module or any apparatus configured to perform the functions recited by the aforementioned means.

According to certain aspects of the present disclosure, each of the local processing units 202 may be configured to determine parameters of the neural network based upon one or more desired functional features of the neural network. Each of the local processing units 202 may be further configured to develop the one or more functional features towards the desired functional features as the determined parameters are further adapted, tuned and updated.

Figure 6:
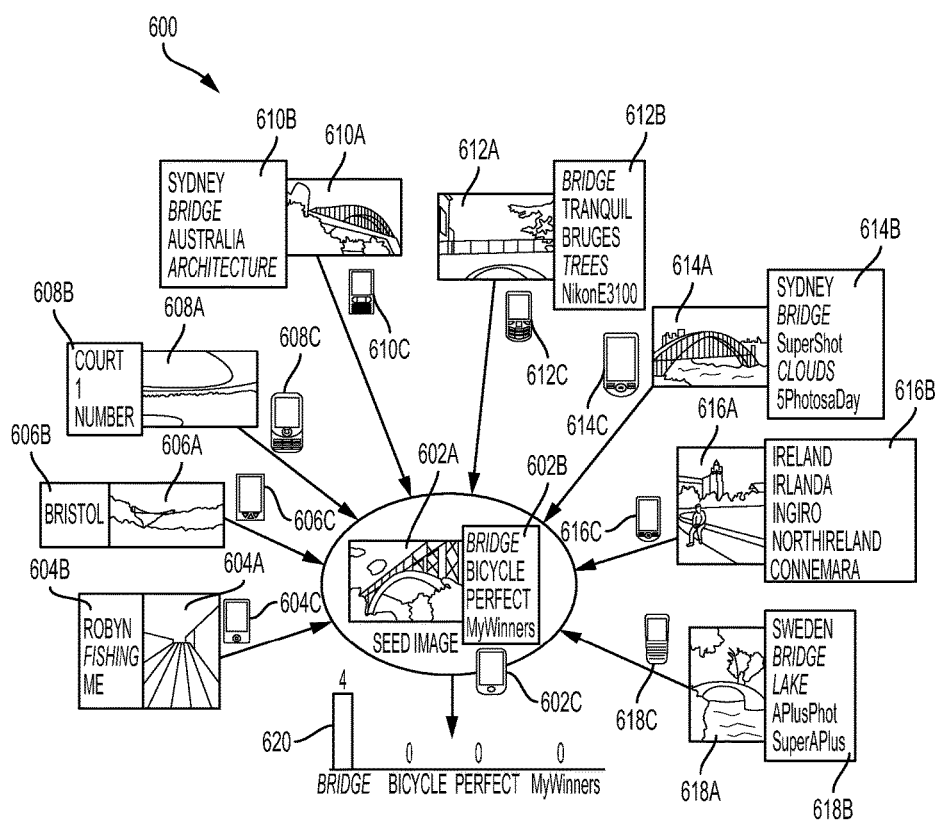
FIG. 6 illustrates a method for updating label relevance by neighbor voting in accordance with aspects of the present disclosure.

FIG. 6 illustrates a technique for updating label relevance by neighbor voting according to aspects of the present disclosure. A device connects to at least one other device on an ad hoc network and indexes media and corresponding labels in the ad hoc network. Once indexed, a computed feature representation of a seed media file is compared with feature representations of other media files in the ad hoc network to create an ordered list. Once the ordered list is formed, it is determined whether a label corresponding to the media file on the ordered list matches a label of the seed media file. A label frequency increases when the label corresponding to the media file on the ordered list matches the label of the seed media file.

The center of the illustration 600 of the media labeling technique of FIG. 6 shows an image 602A with labels 602B provided by a user. The image 602A and the labels 602B may reside on the user's device 602C. Labels provided by users may be ambiguous, limited in terms of completeness, and overly personalized. For this image 602A, the user ascribed four labels 602B: "bridge," "bicycle," "perfect" and "MyWinners." The image 602A features a bridge. No bicycle may be discerned from the illustration 600, but from the labels 602B it may be deduced that the image was taken during a bicycle outing. The labels "perfect" and "MyWinners" do not describe contents of the image but may reflect a sentiment of the user regarding the image 602A and provide examples of labels that are ambiguous, limited in terms of completeness, and overly personalized.

For the purposes of visual content understanding, general purpose search, and the like, labels that describe objective aspects of the visual content may be desired. Labels that describe objective aspects of the visual content may be considered relevant. By contrast, labels that are subjective or overly personalized may not be useful for visual content understanding, general purpose search, and the like, and may be considered irrelevant. For a given image, the irrelevant labels may outnumber the relevant labels. For the image 602A, for example, only the label "bridge" appears to be relevant. Based on the labels of a given image, therefore, the relevant and irrelevant labels may not be distinguishable based on their frequency of occurrence.

The technique illustrated in 600, according to aspects of the present disclosure, provides for an accurate and efficient determination of the relevance of a label with respect to the content that the label purports to describe. Using this technique, the image 602A may be considered a seed image file. The label relevance of each label, or tag, is estimated by accumulating the neighbor votes that it may receive from visually similar images.

In this example, the eight most visually similar images, 604A, 606A, 608A, 610A, 612A, 614A, 616A, and 618A, are shown in the periphery. The visually similar images (e.g., 604A, 606A, 608A, 610A, 612A, 614A, 616A, and 618A) may be associated with a different mobile device, 604C, 606C, 608C, 610C, 612C, 614C, 616C, and 618C, respectively, which may be connected to the user's device 602C via communication on an ad hoc network. In addition, each image may have a set of labels, 604B, 606B, 608B, 610B, 612B, 614B, 616B, and 618B, respectively. The use of mobile smartphones (e.g., 604C, 606C, 608C, 610C, 612C, 614C, 616C, and 618C) in the illustration is not meant to be limiting. The images may also reside on other devices that connect to the ad hoc network, such as laptop computers, aerial drones, houses, and the like.

In the illustrated example, four of the top eight most similar images 610A, 612A, 614A, and 618A share a label with the labels of the seed image (e.g., 602B). In all four instances, the shared label is "bridge." In this example, none of the other labels associated with the seed image are shared with the top eight most similar images. As a result, a label frequency 620 associated with the seed image may be updated (using, for example, the pseudo code 700 shown in FIG. 7 and described below) to reflect the contributions of the visually similar neighbor images. Accordingly, it may be determined that "bridge" is the most relevant, objective label of the four labels initially associated with the seed image.

In addition to providing a relevance estimate for labels in an image, aspects of the present disclosure may be directed to providing a label or labels for an unlabeled image. In an alternative aspect, the updating of the label frequency would not be gated by the co-occurrence of a label associated with the seed image and another image, but rather, would reflect an accumulation of the labels of the neighboring images. In the example shown in the illustration 600, the most frequently occurring label among the neighboring images is again "bridge." In this way, aspects of the present disclosure may provide automated image labeling for unlabeled images.

The use of labels, if available, for a seed image may improve the quality of media labeling according to aspects of the present disclosure because the label of the seed image may effectively filter out different media containing different objects that are visually similar (in the case of images). Furthermore, the use of a similarity measure in conjunction with labels may lessen a reliance on similarity measurement accuracy or reliability. That is, the content-based similarity measurement may be lightweight and yield high failure rates when considered on its own, but the combination of the similarity measurement with the gating by labels, according to aspects of the present disclosure, may yield high accuracy.

The method shown in the illustration 600 may also be applied to other types of media files, such as audio files, olfactory files, biosensor data files, data collected on a smartphone, data collected on a vehicle, data collected on a medical device, data collected on a scientific instrument, or some combination thereof. According to aspects of the present disclosure, the seed media file (e.g., the image 602A) and the media files on an ad hoc network (e.g. 604A, 606A) may be audio files. If the media files are audio files, the media file labels (e.g. 602B, 604B, 606B) may include descriptors such as "hip-hop" or "Elvis" and the feature representation may be configured to process audio data.

According to aspects of the present disclosure, media files may contain multiple modalities. For example, a movie or music video file may contain a sequence of images and an audio soundtrack. For multi-media files, the method illustrated in 600 may be applied to each modality separately and then combined. Alternatively, a feature representation may be computed based on multiple modalities for each media file, and then the method illustrated in 600 may be applied.

FIG. 7 illustrates pseudo code for an aspect of the present disclosure. The pseudo code 700 illustrates how aspects of the present disclosure may be applied to update the relevance of all labels of all images in an ad hoc network. In one aspect of the present disclosure, the user's device 602C may establish an ad hoc network A and then index all images and labels on devices in A, such as the devices (e.g., 602C, 604C, 606C, 608C, 610C, 612C, 614C, 616C, and 618C in the illustration 600. Aspects of the present disclosure may also be directed to a subset of the images and labels present in a network. Aspects of the present disclosure may also be configured to operate continuously as other devices join and leave the ad hoc network. Aspects of the present disclosure may be configured to operate when a device connects to an existing ad hoc network, obviating the establishing step shown in 700.

After a device, for example 602C, has connected to at least one device on an ad hoc network, for example the devices (e.g., 604C, 606C, 608C, 610C, 612C, 614C, 616C, 618C and other devices (not shown)), it may index media, for example 604A, 606A, 608A, 610A, 612A, 614A, 616A, 618A and other media (not shown), and corresponding labels, for example 604B, 606B, 608B, 610B, 612B, 614B, 616B, 618B, and other labels (not shown) on those devices. The device may additionally index media and labels on the user's device 602C. For each image I in A, the K nearest visual neighbors of I from all labeled images in A may be identified. In the illustration 600, I may be considered the seed image (e.g., 602A); A may be the ad hoc network that comprises the devices (e.g., 602C, 604C, 606C, 608C, 610C, 612C, 614C, 616C, and 618C); and K may be configured to be equal to 8.

Next, each label w of the set of labels of I, for example 602B, is considered in turn. The iterator w is set to the value of the first label of 602B, "bridge," in the first iteration. The value of an element of an array, networkLabelRelevance, corresponding to w=bridge, I=602A, K=8, and A=the current ad hoc network, is set to 0. In the subsequent iterative steps, the array is also set to 0 for w="bicycle," "perfect" and "MyWinners." Each of these labels may correspond to a numeric value for the array networkLabelRelevance. Alternatively, networkLabelRelevance may be implemented as a more flexible data structure, such as a dictionary of key-value pairs. After this iteration, the array or data structure networkLabelRelevance will be set to 0 for all labels for the image I. According to aspects of the present disclosure, this initialization procedure may be skipped.

Next, the labels in the neighbor set of I are considered. In the example 600, the neighbor set of I is the K=8 most visually similar images 604A, 606A, 608A, 610A, 612A, 614A, 616A, and 618A. For each image J in the neighbor set, which may be 604A in the first iteration, the corresponding labels of J (604B) are considered. First, the intersection of labels in J (604B) and I (602B) are determined. In the first iteration there are no common labels. Because the intersection of labels is an empty set, the contents of the iterative for loop "for label w in (intersection of labels of J and labels of I) do" in 700 will not execute. On the second iterative step of the for loop "for image J in the neighbor set of I do" in 700 the labels of the second image of the neighbor set are considered. Again, the intersection of the currently considered labels 606B and the labels 602B of the seed image is an empty set. An empty set is again encountered on the third iteration in which 608B is considered.

On the fourth iteration, however, the intersection of labels 610B and 602B yields the common element "bridge." Because the intersection is not an empty set, the contents of the iterative for loop "for label w in (intersection of labels of J and labels of I) do" will execute. The networkLabelRelevance array is incremented by 1 at the index to the array corresponding to w="bridge," I=602A, k=8, A=current ad hoc network. At this point the value is set to 1 from 0. During the next step of the iteration the labels 612B are considered. Again the intersection is not an empty set because there is a common element "bridge" in 612B and 602B. The array networkLabelRelevance is incremented again. At this point the value is set to 2 from 1 at the index to the array corresponding to w="bridge," I=602A, k=8, A=current ad hoc network.

The iteration continues to the end of the K most visually similar images (the neighbor set of I). After all of the images in the neighbor set have been considered, the array networkLabelRelevance will have values: 4, 0, 0, 0 corresponding to w="bridge," "bicycle," "perfect," and "MyWinners," as shown in 620. Before moving to the next seed image, a max operation may be applied. The max operation shown in 700 has the effect of replacing all 0 values in the final array with 1 for the values of w that correspond to original labels of the image. If the max operation is applied, the array networkLabelRelevance will have values: 4, 1, 1, 1 corresponding to w="bridge" (4), "bicycle" (1), "perfect" (1), and "MyWinners" (1) for the image I. After all of the steps detailed above, a new image on the network may be chosen as the seed image and the whole process may repeat.

According to aspects of the present disclosure, the visual neighbors may be based on a visual similarity metric. For example, a combined 64-dimensional global feature may be utilized, in which the 64 dimensions consist of a 44-dimensional color correlogram, a 14-dimensional color texture moment, and a 6-dimensional RGB color moment. Such a feature vector may balance competing aims of effectiveness and efficiency. As an alternative, a feature vector that may be a basis of the visual similarity metric may be a 980 dimensional GIST feature representation of the spatial structure of a scene. The varieties of feature vectors disclosed are not intended to be limiting. Other feature vectors may also be used for visual media files, such as SURF, Dense-SURF or Color64. Furthermore, other types of media files, such as audio media files, may use feature vectors tailored to the type of media. In yet another aspect, the state and/or the output of a neural network may be used as the feature vector or may contribute to the calculation of a feature vector.

In some aspects, the present disclosure provides a way to exchange and update media label relevance based on information that is communicated through devices in an ad hoc network. Each device in the network may communicate a matrix of feature vectors, such that each row or column may be a feature vector for one media file on the device. Alternatively, a first device on the network may transmit its media files to a second device on the network and the feature vectors may be computed on the second device. In this alternative, the feature vectors may be transmitted back to the first device for later use, may be stored on the second device, or may be used for calculation of a similarity metric and discarded.

In one aspect of the present disclosure, each device may compute a standardized feature vector for each type of media file or for each modality of each media file. Alternatively, a standardized feature vector may be calculated for multiple media types, alone or in combination, such as audio files and movies. Standardized feature vectors may facilitate comparing the feature representation of the seed media with feature representations of other media, according to aspects of the disclosure. Alternatively, the comparing of features may involve different types of feature vectors. For example, a first device may compute Dense-SURF features for visual media files, while a second device may compute SURF features for visual media files. The comparing may include converting one feature vector to another, or may include a direct comparison based on an appropriate comparison method. A similarity metric may be determined based on the comparison between media files, such as between a first media file and a second media file.

In some aspects, the present disclosure may incur a low computational burden and may utilize a low communication bandwidth. According to aspects of the present disclosure, the computation of the feature vector may be performed once for each image, as the feature vector computation may be independent of queries to a host device.

Some aspects of the present disclosure may also be applied to training classifiers. For example, the method may be directed to a selection of the most positive and negative media label examples. These examples may then be used for further processing, such as used to train a deep learning classifier. In addition, such a classifier may be personalized to a particular user or group of users.

Some aspects of the present disclosure may be directed to a system of collective intelligence. For example, a group of unmanned aerial vehicles (UAVs) may collect and analyze images with on-board cameras and processors. Each UAV may have an on-board image classifier that predicts labels for its collected images. According to aspects of the present disclosure, the UAVs may communicate feature vector matrices to each other by way of a wireless network, and according to aspects of the present disclosure, improve the quality of labeled images among themselves. Collectively, the group of UAVs may outperform the object recognition and labeling capability of each UAVs considered alone in both speed and accuracy.

Figure 8:
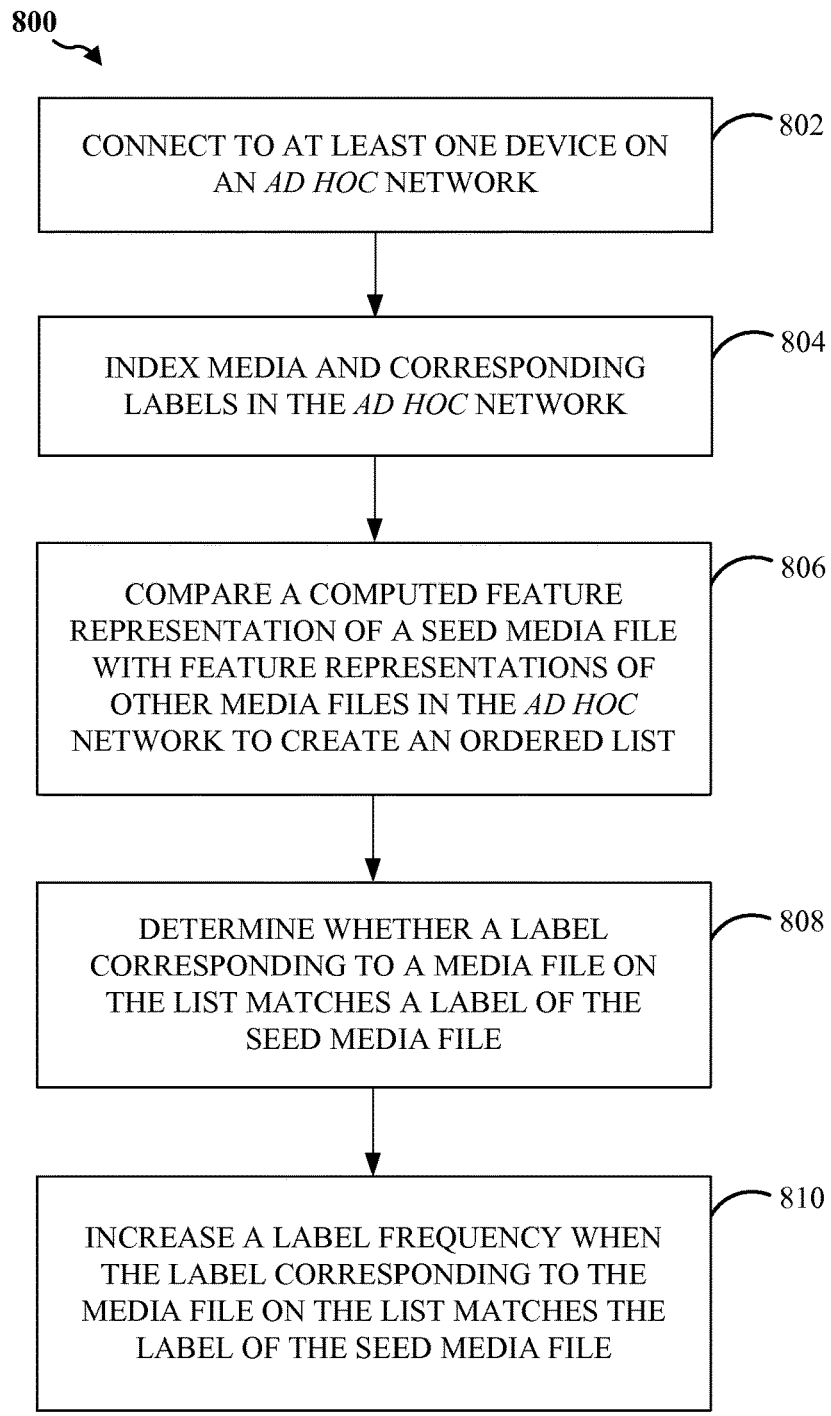
FIG. 8 illustrates a method for labeling media files in accordance with aspects of the present disclosure.

FIG. 8 illustrates a method 800 for labeling media files. In block 802, the process connects to at least one device on an ad hoc network. In block 804 the process indexes media and corresponding labels in the ad hoc network. In block 806, the process compares a computed feature representation of a seed media file with feature representations of other media files in the ad hoc network to create an ordered list. In block 808, the process determines whether a label corresponding to a media file on the list matches a label of the seed media file. In block 810, the process increases a label frequency when the label corresponding to the media file on the list matches the label of the seed media file.

In some aspects, the increasing of a label frequency 620 may be weighted by a similarity metric that is based on a comparison between the seed image file (e.g., 602A) and another similar image file in the ad hoc network. The similarity metric may correspond to a multidimensional distance in a feature space such that a more similar feature in a more similar image (e.g. 610A) corresponds to a shorter distance and a more dissimilar feature in a more dissimilar image (e.g., 618A) corresponds to a longer distance. According to aspects of the present disclosure in which the increasing of a label frequency is weighted by the distance, the weights assigned to each dimension of the feature vector may be adjusted to improve overall performance. In this way, the similarity function may adapt to the data over time and the system may be considered to include metric learning.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of labeling media files, comprising:
   connecting to at least one device on an ad hoc network;
   indexing media and corresponding labels in the ad hoc network, the corresponding labels comprising relevant and irrelevant information about the media;
   comparing a computed feature representation of a seed media file with feature representations of other media files in the ad hoc network to create an ordered list of similar media files;
   determining whether a label corresponding to a media file on the ordered list matches the label of the seed media file; and
   increasing a label frequency when the label corresponding to the media file on the ordered list matches the label of the seed media file.

2. The method of claim 1, in which the comparing, determining, and increasing are repeated for other media files in the ad hoc network.

3. The method of claim 1, in which the media file contains at least one of image data, audio data, olfactory data, biosensor data, data collected on a smartphone, data collected on a vehicle, data collected on a medical device, data collected on a scientific instrument, or a combination thereof.

4. The method of claim 1, further comprising determining a similarity metric based on the comparing of the computed feature representation of the seed media file with the computed feature representation of a second media file on the ad hoc network.

5. The method of claim 4, in which the determining of the similarity metric is adapted to data according to metric learning.

6. The method of claim 1, further comprising labeling the media file based at least in part on the label frequency.

7. The method of claim 6, further comprising training a classifier based at least in part on labeled media files.

8. An apparatus configured to label media files, the apparatus comprising:
   a memory; and
   at least one processor coupled to the memory, the at least one processor being configured:
   to connect to at least one device on an ad hoc network;
   to index media and corresponding labels in the ad hoc network, the corresponding labels comprising relevant and irrelevant information about the media;
   to compare a computed feature representation of a seed media file with feature representations of other media files in the ad hoc network to create an ordered list of similar media files;
   to determine whether a label corresponding to a media file on the ordered list matches the label of the seed media file; and
   to increase a label frequency when the label corresponding to the media file on the ordered list matches the label of the seed media file.

9. The apparatus of claim 8, in which the at least one processor is further configured to repeat comparing the computed feature representation, determining whether the label corresponding to the media file on the ordered list matches the label of the seed media file, and increasing the label frequency when the label corresponding to the media file on the ordered list matches the label of the seed media file are repeated for other media files in the ad hoc network.

10. The apparatus of claim 8, in which the media file includes at least one of image data, audio data, olfactory data, biosensor data, data collected on a smartphone, data collected on a vehicle, data collected on a medical device, data collected on a scientific instrument, or a combination thereof.

11. The apparatus of claim 8, in which the at least one processor is further configured to determine a similarity metric based at least in part on the comparing of the computed feature representation of the seed media file with the computed feature representation of a second media file on the ad hoc network.

12. The apparatus of claim 11, in which the determining of the similarity metric is adapted to data according to metric learning.

13. The apparatus of claim 8, in which the at least one processor is further configured to label the media file based at least in part on the label frequency.

14. The apparatus of claim 13, in which the at least one processor is further configured to train a classifier based at least in part on labeled media files.

15. An apparatus configured to label media files, the apparatus comprising:
   means for connecting to at least one device on an ad hoc network;
   means for indexing media and corresponding labels in the ad hoc network, the corresponding labels comprising relevant and irrelevant information about the media;
   means for comparing a computed feature representation of a seed media file with feature representations of other media files in the ad hoc network to create an ordered list of similar media files;

means for determining whether a label corresponding to a media file on the ordered list matches the label of the seed media file; and means for increasing a label frequency when the label corresponding to the media file on the ordered list matches the label of the seed media file.

16. The apparatus of claim 15, in which the comparing, the determining, and the increasing are repeated for other media files in the ad hoc network.

17. The apparatus of claim 15, in which the media file includes at least one of image data, audio data, olfactory data, biosensor data, data collected on a smartphone, data collected on a vehicle, data collected on a medical device, data collected on a scientific instrument, or a combination thereof.

18. The apparatus of claim 15, further comprising means for determining a similarity metric based on the comparing of the computed feature representation of the seed media file with the computed feature representation of a second media file on the ad hoc network.

19. The apparatus of claim 18, in which the means for determining the similarity metric is adapted to data according to a means for metric learning.

20. The apparatus of claim 15, further comprising means for labeling the media file based at least in part on the label frequency.

21. The apparatus of claim 20, further comprising means for training a classifier based at least in part on labeled media files.

22. A computer program product for labeling media files, the computer program product comprising:

a non-transitory computer readable medium having program code recorded thereon, the program code comprising:

program code to connect to at least one device on an ad hoc network;

program code to index media and corresponding labels in the ad hoc network, the corresponding labels comprising relevant and irrelevant information about the media;

program code to compare a computed feature representation of a seed media file with feature representations of other media files in the ad hoc network to create an ordered list of similar media files;

program code to determine whether a label corresponding to a media file on the ordered list matches the label of the seed media file; and program code to increase a label frequency when the label corresponding to the media file on the ordered list matches the label of the seed media file.

23. The computer program product of claim 22, further comprising program code to repeat the comparing, the determining, and the increasing for other media files in the ad hoc network.

24. The computer program product of claim 22, in which the media file includes at least one of image data, audio data, olfactory data, biosensor data, data collected on a smartphone, data collected on a vehicle, data collected on a medical device, data collected on a scientific instrument, or a combination thereof.

25. The computer program product of claim 22, further comprising program code to determine a similarity metric based on the comparing of the computed feature representation of the seed media file with the computed feature representation of a second media file on the ad hoc network.

26. The computer program product of claim 25, further comprising program code to determine the similarity metric by adapting to data according to metric learning.

27. The computer program product of claim 22, further including program code to label the media file based at least in part on the label frequency.

28. The computer program product of claim 27, further including program code to train a classifier based at least in part on labeled media files.

\* \* \* \* \*